US 6,879,722 B2

(12) United States Patent
Crepy

(10) Patent No.: US 6,879,722 B2
(45) Date of Patent: Apr. 12, 2005

(54) METHOD AND APPARATUS FOR STATISTICAL TEXT FILTERING

(75) Inventor: Hubert Crepy, Boulogne (FR)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 09/895,562

(22) Filed: Jun. 29, 2001

(65) Prior Publication Data

US 2002/0114524 A1 Aug. 22, 2002

(30) Foreign Application Priority Data

Dec. 20, 2000 (FR) .......................................... 00 480126

(51) Int. Cl.$^7$ ................................................ G06K 9/72
(52) U.S. Cl. .................................... 382/229; 382/176
(58) Field of Search ................................. 382/229, 173, 382/176, 228, 230, 305; 704/1–10; 707/6, 102, 1–5, 104.1; 715/531–541

(56) References Cited

U.S. PATENT DOCUMENTS

| | | | | |
|---|---|---|---|---|
| 5,062,143 A | * | 10/1991 | Schmitt ...................... | 382/230 |
| 5,752,051 A | * | 5/1998 | Cohen ............................ | 704/1 |
| 6,144,934 A | * | 11/2000 | Stockwell et al. ............. | 704/1 |

FOREIGN PATENT DOCUMENTS

EP 1 229 454 A2 * 8/2002 ........... G06F/17/27

OTHER PUBLICATIONS

Basili et al., A robust model for intelligent text classification, University of Rome Tor Vergata, Dept. of computer science.*

Hu et al., A human simulating mechanism for chinese information filtering, IEEE 0–7803–7268–9/01, 1582–1585.*

F Jelinek, R. Mercer: "Interpolated Estimation of Markov Source Parameters from Sparse Data", In Proceedings of the workshop on Pattern Recognition in Practice, North Holland Publishing Company, 1980.

* cited by examiner

Primary Examiner—Led Boudreau
Assistant Examiner—Ishrat Sherali
(74) Attorney, Agent, or Firm—Farrokh E. Pourmirzaie

(57) ABSTRACT

Disclosed herein is a method for automatically filtering a corpus of documents containing textual and non-textual information of a natural language. According to the method, through a first dividing step (101), the document corpus is divided into appropriate portions. At a following determining step (105), for each portion of the document corpus, there is determined a regularity value ($V_R$) measuring the conformity of the portion with respect to character sequences probabilities predetermined for the language considered. At a comparing step (107), each regularity value ($V_R$) is then compared with a threshold value ($V_T$) to decide whether the conformity is sufficient. Finally, at a rejecting step (111), any portion of the document corpus whose conformity is not sufficient is rejected and removed from the corpus. An apparatus for carrying out such a method is also disclosed.

28 Claims, 3 Drawing Sheets

METHOD AND APPARATUS FOR STATISTICAL TEXT FILTERING

CLAIM OF PRIORITY

This application claims the foreign priority benefits under 35 U.S.C. §119 of European application No. 00480126.2 filed on Dec. 20, 2000, which is incorporated herein by reference.

BACKGROUND OF THE INVENTION

1. Field of the Invention

The invention relates in general to statistical language modeling. More particularly the invention relates to a method for automatically filtering a corpus of documents containing textual and non-textual information of a natural language to model, in order to obtain a corpus of documents that is well representative of the natural language. The invention also relates to an apparatus for carrying out such a method.

2. Description of Related Art

Textual information is commonly formatted for the human eye, intermingled with non-textual information such as tables, graphics, etc. When such textual information needs to be processed by a machine (e.g. for delivery to a human through speech synthesis or for translation purpose), it becomes necessary to separate what really constitutes text (i.e. a succession of words and punctuation) from the non-textual information.

One such requirement applies to the elaboration of text corpora for statistical language modeling. Present statistical models used in Natural Language Processing (NLP) systems, such as speech recognition systems, require the analysis of large bodies of documents.

These documents, collectively referred to as corpus, need to be as "true-to-life" as possible and are therefore collected from a wide variety of sources. As a consequence, together with the desired textual information (the "wheat") in those corpora, there is usually a lot of non-exploitable data (the "chaff"), such as binary attachments, images, logos, headers, footers, tables, line drawings and so on.

Thus, prior to running a meaningful statistical analysis on such a corpus of documents, the corpus needs to be cleaned up so that only the "real" textual portions are kept.

Up to now, the above "cleaning" operation of a corpus of documents is commonly performed in a manual way, that is, each document is edited by a person on a display screen and the document is "filtered" upon visual inspection.

As a typical document corpus contains tens of millions of words, manual editing and filtering is extremely labor-intensive and costly. It can also be error-prone, and potentially have dramatic consequences, e.g. if a corpus is damaged beyond repair by an over-enthusiastic use of the delete function.

In order to reduce the time necessary to achieve such a visual filtering of a corpus of documents, some software tools have been developed to assist people in performing this task. These software tools were designed to automate visual rules based on heuristics and "ad-hoc" observations.

Such rules are for instance: "Delete lines that contain less than 20% lowercase characters", or "Delete lines that are more than 256 characters long". Other rules were defined, based on visual inspection of the documents, such as: "Delete all the text that appears between two lines formed by '-------'" (when this is the way a table of numbers is presented in a given corpus).

All the above rules, even when they are implemented in a computer program, rely on visual inspection of the corpus and on human intervention. With such a "manual" filtering procedure, the cost of a sequence of filtering operations is commonly estimated to range, in average, from 1 to 2-man week, depending on the corpus size and the number of different sources it encompasses.

Thus, as underlined above, given the great deal of time required by present corpus filtering methods to operate, and the high risk of errors they imply as a consequence of human intervention, there is real need of a corpus filtering method that improves such an empiric method of filtering a large corpus of documents. This need is presently addressed by the invention disclosed herein.

SUMMARY OF THE INVENTION

A main object of the invention is therefore to provide an improved method for filtering a large corpus of documents, which remedy the aforementioned drawbacks of current filtering methods.

To this end, according to a first aspect, the invention concerns a method for automatically filtering a corpus of documents containing textual and non-textual information of a natural language. The method comprises the steps of:

dividing the corpus of documents into appropriate portions;

determining for each portion of the corpus of documents a regularity value measuring the conformity of the portion with respect to character sequences probabilities predetermined for the language considered;

comparing each regularity value with a threshold value to decide whether the conformity is sufficient; and rejecting any portion of the corpus of documents whose conformity is not sufficient.

This new method as implemented in a computer program provides an efficient means for filtering a large corpus of documents in a quick and non error-prone way.

According to a particularly advantageous characteristic of the invention, the predetermined character sequence probabilities are derived from a statistical model representative of the language.

In this way, the criteria used for rejecting or keeping a document portion reflect accurately the conformance or non-conformance of the document portion with regard to the rules of the language considered.

According to a preferred embodiment of the invention, the statistical model is previously elaborated from a reference document determined as conforming with the rules of the language under consideration.

According to a variant embodiment, the statistical model is initially used to filter a first segment, of a predetermined size, of the corpus of documents. The resulting first filtered segment then serves as a basis for computing a more accurate statistical model, which is to be used to filter the rest of the corpus of documents.

This iterative procedure provides the additional advantage that the latter model will tend to match much better the words and the format of the corpus in question than any "general-purpose model" could do.

According to a second aspect, the invention concerns an apparatus for automatically filtering a corpus of documents containing textual and non-textual information of a natural language. The apparatus comprises:

means for dividing the corpus of documents into appropriate portions;

means for determining for each portion of the corpus of documents a regularity value measuring the conformity of the portion with respect to character sequences probabilities predetermined for said language;

means for comparing each regularity value with a threshold value to decide whether the conformity is sufficient; and means for rejecting any portion of the document corpus whose conformity is not sufficient.

The invention also relates to a computer system comprising an apparatus as briefly defined above.

The invention still concerns a computer program comprising software code portions for performing a method as briefly defined above, when the computer program is loaded into and executed by a computer system.

The invention further concerns a computer program product stored on a computer usable medium. The computer program product comprises computer readable program means for causing a computer to perform an automatic document corpus filtering method as briefly defined above.

The advantages of this apparatus, this computer system, this computer program, and this computer program product are identical to those of the method as succinctly disclosed above. Other particularities and advantages of the invention will also emerge from the following description.

BRIEF DESCRIPTION OF THE DRAWINGS

In the accompanying drawings, given by way of non-limiting examples.

DETAILED DESCRIPTION OF THE INVENTION

The present invention aims to provide a method for automatically filtering a corpus of documents containing a textual and non-textual information, in order to obtain a corpus of documents whose overall content can be considered as sufficiently representative of a natural language which is to be statistically analyzed.

The term "filtering" shall be construed as meaning the removing from the collection of documents making up the corpus, those portions which are not representative of the language under consideration, such as non-textual portions (e.g. graphics, tables) and textual portions expressed in another language.

Figure 1:
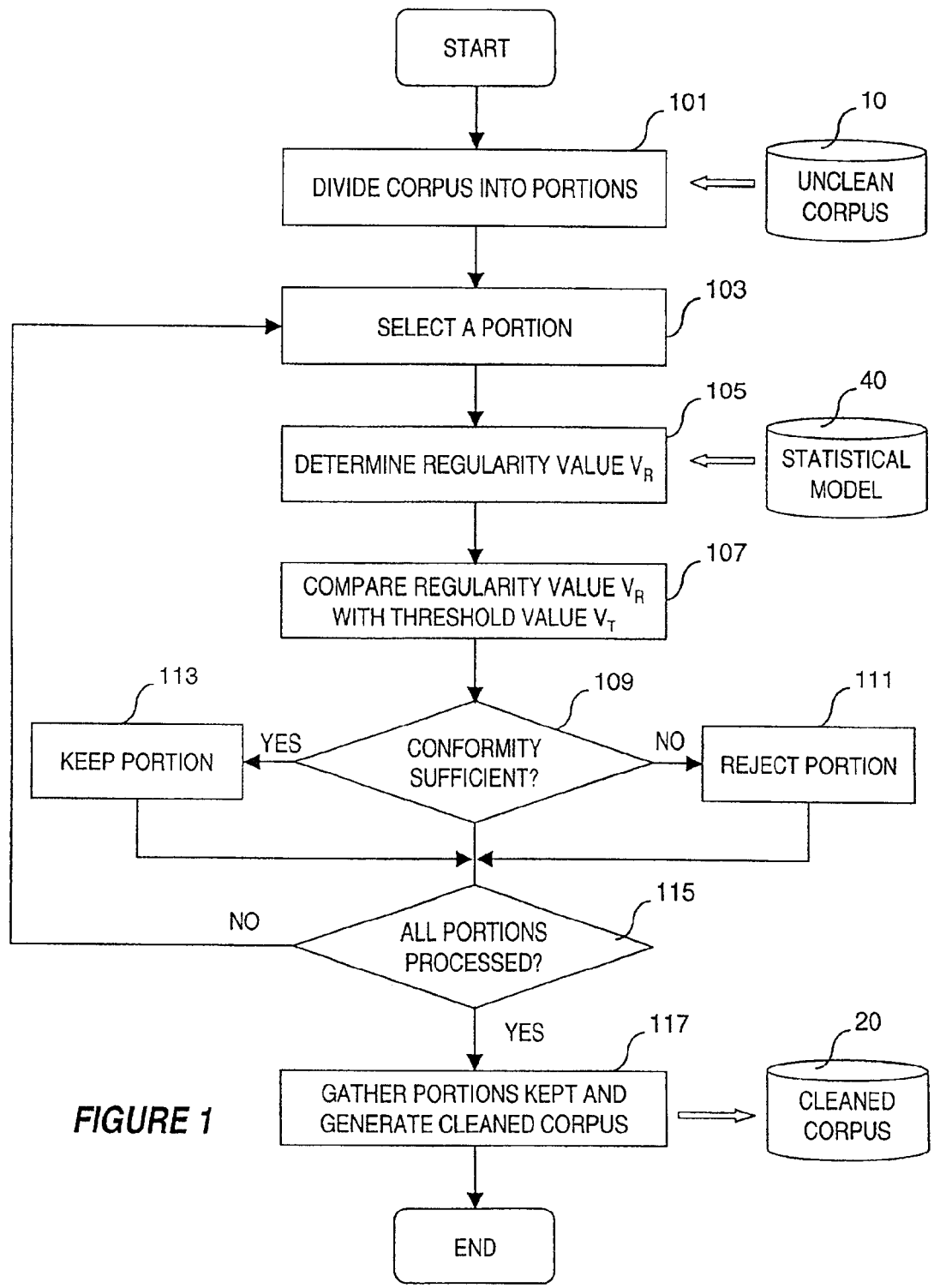
FIG. 1 is a flow chart illustrating the essential steps of a document corpus filtering method according to the invention.

With reference to FIG. 1, a description will be given of the corpus filtering method according to the invention. FIG. 1, which is a flow chart, depicts the essential steps of this corpus filtering method.

As shown in FIG. 1, the corpus filtering method according to the invention starts with a step 101 of dividing a corpus of documents denoted 10 (which is to be filtered) into appropriate portions. In step 101, the document corpus is divided into portions—e.g. lines, paragraphs or whole documents—whose size is determined as a function of the document corpus' overall size and/or as a function of the nature of the documents contained in the corpus. The size determined for the portions resulting from the division makes it possible to obtain a granularity desired for the filtering.

Each portion resulting from the dividing step will then be treated independently from the others as will be explained further.

For example, a section of a non-cleaned corpus may resemble as follows.

Example of an "unclean" corpus document:

Today's statistical models used in Natural Language Processing systems (speech recognition systems, for example) require the analysis of large bodies of documents, in which normal text of the language will be intermingled with non-textual data such as:

| Average 85% of Week Day | Market Price | Market Price | Spli DOG | Adju |
|---|---|---|---|---|
| 00/11/10 | 95.69 | 81.34 | 92.73 | 1 |
| 00/11/09 | 97.84 | 83.17 | 92.73 | 1 |
| 00/11/08 | 101.50 | 86.28 | 92.73 | 1 |
| 00/11/07 | 102.09 | 86.78 | 92.73 | 1 |
| 00/11/06 | 100.90 | 85.77 | 92.73 | 1 |
| 00/11/03 | 101.00 | 85.85 | 92.73 | 1 |

One will also find sections that do not belong to the language in question, such as:

Les modèles statistiques utilisés an traitement automatique des langues reposent sur l'analyse de grandes quantités de textes.

In the above example, the language under consideration for statistical analysis is the English language. As can be seen in this example document, the portion size suitable for the dividing step would be a paragraph. With a paragraph being defined as a set of characters that is isolated upwards and downwards by at least one blank line.

When passed through the filter, with an appropriate model and threshold, the first paragraph (English text) would be retained, the second (stock price table) would be rejected as not being text, the third (English text again) would be retained, and the last one (French text) would also be rejected, since its letter sequences are "odd" with respect to the letter sequence expectations of the English language.

Returning to FIG. 1, after the unclean document corpus 10 has been divided into appropriate sized portions (step 101), according to the invention, for each portion, there will be determined a regularity value measuring the conformity of the portion with respect to character sequences probabilities predetermined for the language under consideration. To this end, step 103 is first entered to select one of the corpus portions (current portion) resulting from the division of the corpus performed in step 101.

Then, in step 105, a regularity value denoted $V_R$ is determined. As previously mentioned this regularity value is intended to measure the conformity of the portion selected with respect to character sequences probabilities predetermined for the language under consideration.

According to a preferred implementation of the invention, the character sequence probabilities are derived from a statistical model (40) representative of the language considered. In this preferred implementation, the regularity value $V_R$ is based on a computed perplexity of the portion with respect to the statistical model. As will be detailed later down in the description, prior to the corpus filtering, the statistical model is elaborated from a reference document determined as conforming with the rules of the language. The process of computing such a language model, in accordance with a preferred implementation of the invention, will be detailed further below in connection with FIG. 2.

According to a preferred embodiment of the invention, the statistical model is a character-based N-gram model.

Language models such as character-based N-gram models are known in the art. In general terms, a language model, as for instance a N-gram model, tries to predict the a-priori probability of a N character long string occurring in a given language. Theoretically, one would like to predict a new character from an infinitely long history of predecessor characters. Practically, however, these probabilities would be impossible to compute. A common approach is then to approximate all histories to the same state. Thus one assumes that the occurrence of a character C is completely determined by the past N characters. Tri-gram models, for instance, use the two preceding characters to predict the current character. As the tri-gram frequencies may not be seen frequently enough to yield good prediction, the tri-gram model is often combined with lower-order models predicting the bi- and uni-gram probabilities.

According to a preferred implementation for the regularity value, it is suggested to compute the perplexity of the orthographic representation of a word with respect to a character-based N-gram model.

Perplexity is an information-theory measurement, expressed as a number. It is an indication of how many different letters are likely to follow a particular context of string characters.

Informally perplexity may be regarded as the average number of following characters that a character-based language model may have to choose from, given the present history of characters already looked at.

Formally, the perplexity is the reciprocal of the geometric average of the probabilities of a hypothesized string of characters.

Returning to FIG. 1, once the regularity value has been determined (step 105) for the current portion of the corpus, step 107 is entered, in which there is made a comparison between the regularity value $V_R$ and a threshold value $V_T$, in order to decide whether the conformity of the current portion with respect to the character sequences probabilities derived from the statistical model 40, is sufficient or not.

According to the invention, threshold value $V_T$ is determined beforehand by firstly defining a test corpus as a subset of the document corpus to be filtered. Then a manual cleaning is performed on the test corpus so as to obtain a cleaned test corpus, which is representative of the type of textual information that is considered as being sufficiently in conformity with the language rules. After that, a perplexity value of said cleaned test corpus with regard to said statistical model is computed. Similarly, it is computed a perplexity value of the rejected test corpus (i.e., the set of portions rejected from the initial test corpus). Finally, the threshold value searched is determined between the two perplexity values obtained (for example as the average value of these two perplexity values).

At step 109 in FIG. 1, if the conformity of the portion under consideration is determined as being sufficient, the portion is kept (step 113). Conversely, if the portion is determined as being insufficient, the portion is rejected (step 111).

Following step 115 is a determination step, in which it is determined whether all portions of the document corpus have been processed. If not, a next portion is selected (step 103) and the preceding steps are performed again on the new portion selected.

On the contrary, if it is so, at next step 117, all portions that have been kept i.e. not rejected, are gathered in order to form a new corpus of documents 20 which is considered as "cleaned" or filtered. The resulting filtered corpus is then stored for further use.

Now, with reference to FIG. 2, there will be described the process of elaborating a language model forming the base for the determination of the regularity value of a given portion of the corpus of documents, in accordance with a preferred implementation of the invention.

The process starts (step 201) by collecting a corpus of textual data deemed to follow the "regularity" that is to be modeled, both in content (types of word), and in form (punctuation, line breaks, special characters, etc.). The collection of textual data obtained is then manually cleaned (step 203) to keep only pertinent textual data (e.g., graphics, other language text, are suppressed). A clean training corpus 30 is therefore obtained and stored.

At following step 205, the clean training corpus 30 is subdivided into training data 33 and held-out data 35, by randomly selecting a certain percentage of the corpus (e.g. 10%). As will be described hereafter, training data will actually serve as a basis to compute N-grams statistics upon which the statistical model will be determined. On the other hand, held-out data 35 will be used to optimize the statistical model computed from the training data.

Figure 2:
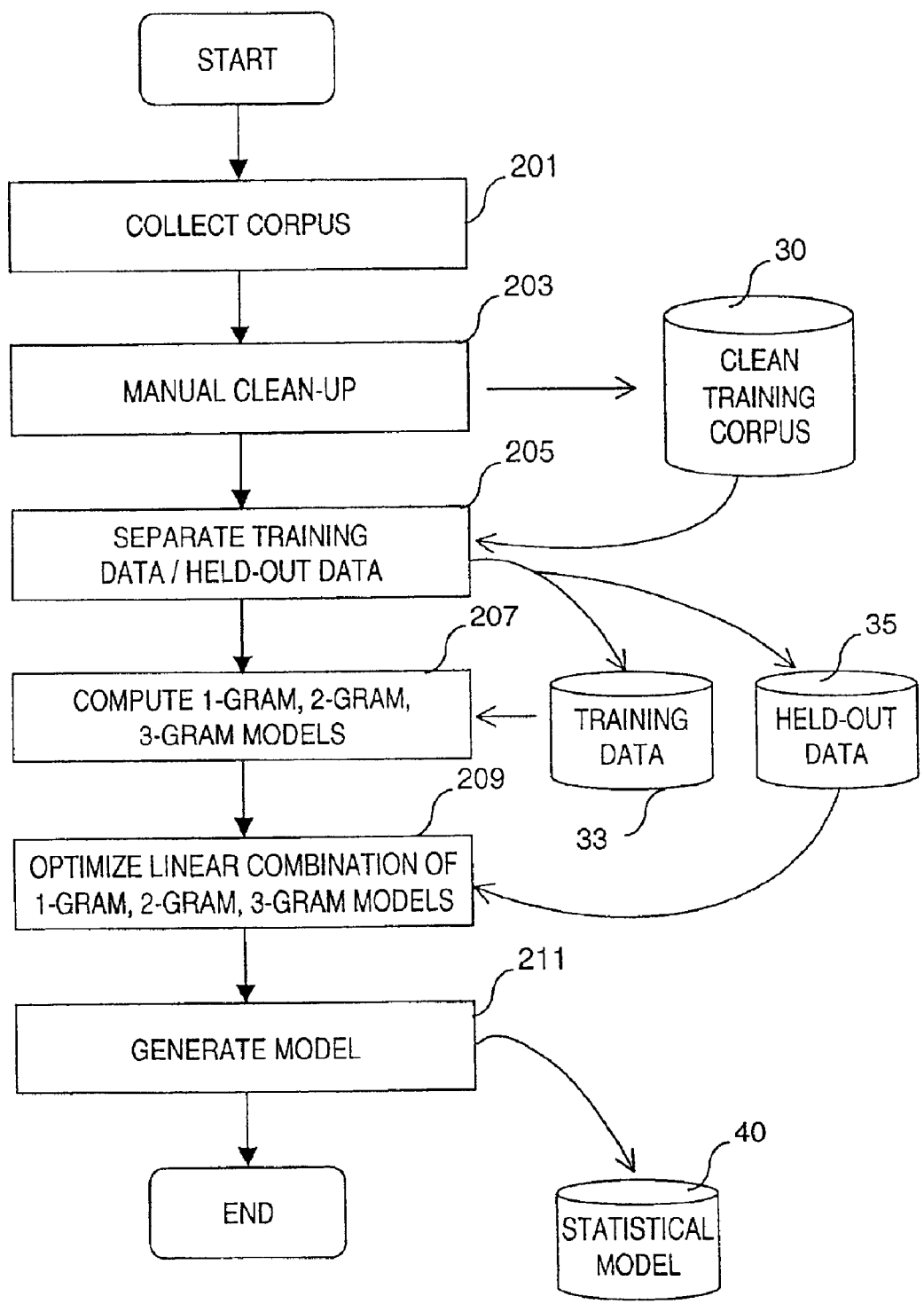
FIG. 2 is a flow chart illustrating the process of elaborating a language model forming the base for the determination of the regularity value of a given portion of the corpus of documents.

As shown at step 207 of FIG. 2, training data 33 is used to compute 1-gram, 2-gram and 3-gram models. The models are computed by counting uni-letter frequencies, bi-letter frequencies, and tri-letter frequencies. The frequencies obtained are then used as approximations of the probability of such letter sequences. The construction and functioning of such N-grams models is known within the state of the art. The overall likelihood of a sequence of 3 letters is computed as a linear combination of the uni-letter, bi-letter and tri-letter likelihood, with an added offset to give non-zero probabilities to never-observed letter sequences.

At step 209, the coefficients of the linear combination can be estimated using the held-out data 35 in order to optimize the performance of the statistical model. A state of the art approach for this process can be found in the teaching of F. Jelinek and R. L. Mercer, "Interpolated Estimation of Markov Source Parameters from Sparse Data" in Proc. of the workshop on Pattern Recognition in Practice, North-Holland Publishing Company, 1980.

Lastly, at step 211, the final statistical model 40 is generated and stored.

According to a preferred implementation of the invention, control/formatting characters such as "tab", "space", "new line" are included in the alphabet of the language to model, in order to not only model the probable letter sequences contained in the language words of a document, but also model the form of the document content.

In accordance with a variant implementation of the invention, in order to improve to accuracy of the corpus filtering, the statistical model is initially used to filter a first corpus segment of a predetermined size to provide a first filtered segment of the document corpus. Then, the first filtered segment serves as a basis for computing a more accurate statistical model, which is to be used to filter the rest of the corpus of documents.

Now, in relation to FIG. 3, there will be described an apparatus for automatically filtering a corpus of documents, in conformity with the invention.

Figure 3:
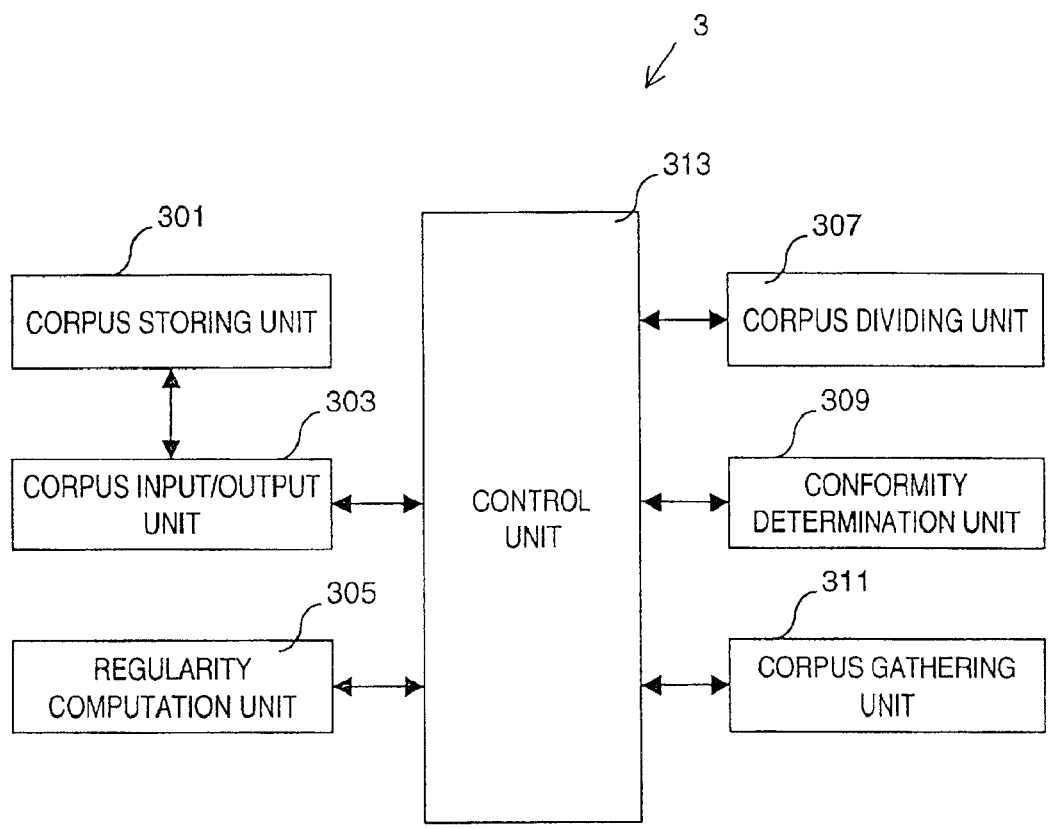
FIG. 3 is a functional block diagram of an apparatus for automatically filtering a corpus of documents, in conformity with the invention.

The apparatus (3) depicted in FIG. 3 includes software and hardware components. In a preferred embodiment, the filtering method of the invention is implemented through a computer program, which is to be run in a computer system for example a microcomputer, in order to carry out the filtering method.

Apparatus 3 comprises a corpus storing unit 301 in which documents forming the corpus can be stored. For example, the storing unit 301 may comprise a hard disk drive, or a Compact Disk (CD) drive. Apparatus 3 includes a corpus input/output unit 303, which is responsible for retrieving from storing unit 301 documents, which are to be processed i.e., filtered, or storing into storing unit 301 documents once filtered.

Filtering apparatus 3 also includes a corpus dividing unit 307 intended for dividing the document corpus into appropriate portions as described above in connection with FIG. 1.

Still within filtering apparatus 3, a regularity computation unit 305 is responsible for determining for each portion of the document corpus a regularity value measuring the conformity of the portion with respect to character sequences probabilities predetermined for the language considered.

A conformity determination unit 309 is then responsible for comparing each regularity value with a threshold value, predetermined as explained supra, to decide whether the conformity is sufficient or not.

Conformity determination unit 309 also handles the task of rejecting any portion of the document whose conformity is determined as being insufficient.

Lastly, a corpus gathering unit 311 makes it possible to gather all the document portions that have not been rejected by the conformity determination unit 309, so as to form the cleaned corpus. The cleaned corpus is then stored into the corpus storing unit 301.

Finally, the filtering apparatus 3 has a control unit 313, for controlling the overall functioning of the apparatus. In particular, control unit 313 is responsible for determining the sequencing of the operations performed by the other units, and for assuring the transfer of the working data from one unit to another.

In summary, there have been disclosed herein a method and an apparatus for automatically filtering a corpus of documents containing textual and non-textual information of a natural language. According to the method, through a first dividing step, the document corpus is divided into appropriate portions. At a following determining step, for each portion of the document corpus, there is determined a regularity value measuring the conformity of the portion with respect to character sequences probabilities predetermined for the language considered. At a comparing step, each regularity value is then compared with a threshold value to decide whether the conformity is sufficient. Finally, at a rejecting step, any portion of the document corpus whose conformity is not sufficient is rejected and removed from the corpus.

One advantage of this method is that it allows the automatic determination of the regularity of portions of textual data with regard to specific language rules. The filtering process according to the invention is implemented as a computer program, which runs in a matter of minutes, as opposed to weeks of skilled labor, required by prior manual methods. Depending on the conditions (initial cleanliness of the corpus, size, etc.), the threshold value ($V_T$), used to decide whether the conformity of a current portion is sufficient or not, can be adjusted to balance the false rejections (i.e., clean text labeled as noise) with respect to the false acceptances (i.e., non-textual portions not flagged as such).

Persons skilled in the art will recognize that many variations of the teachings of this invention can be practiced that still fall within the claims of this invention, which follow.

What is claimed is:

1. A method for automatically filtering a corpus of documents containing textual and non-textual information of a natural language, the method being characterized in that it comprises the steps of:
    dividing the corpus of documents into appropriate portions;
    determining for each portion of the corpus of documents a regularity value ($V_R$) measuring the conformity of the portion with respect to character sequences probabilities predetermined for said language;
    comparing each regularity value with a threshold value ($V_T$) to decide whether the conformity is sufficient; and
    rejecting any portion of the corpus of documents whose conformity is not sufficient.

2. Method according to claim 1, wherein said character sequences probabilities is derived from a statistical model representative of said language.

3. Method according to claim 2, wherein for each portion of the corpus of documents, said regularity value ($V_R$) is based on a computed perplexity of the portion with respect to said statistical model.

4. Method according to claim 2, wherein said statistical model is previously elaborated from a reference document determined as conforming with the rules of said language.

5. Method according to claim 2, wherein said statistical model is being determined according to N-gram statistics.

6. Method according to claim 2, wherein said statistical model is a character-based N-gram model.

7. Method according to claim 2, wherein said statistical model is initially used to filter a first corpus segment of a predetermined size to provide a first filtered segment of the corpus of documents, said first filtered segment serving as a basis for computing a more accurate statistical model which is to be used to filter the rest of the corpus of documents.

8. Method according to claim 1, wherein said threshold value ($V_T$) is determined by executing the steps comprising:
    defining a test corpus as a subset of the corpus of documents to be filtered;
    manually cleaning said test corpus so as to obtain a cleaned test corpus which is representative of the type of textual information that is considered as being sufficiently in conformity with the language rules and a rejected test corpus that is the complement of said cleaned test corpus;
    computing a perplexity value for each of said cleaned and rejected test corpora with regard to said statistical model; and
    setting the threshold value searched between the perplexity values computed.

9. Method according to claim 1, wherein said portions comprise lines, paragraphs, and whole documents—whose size is determined as a function of the overall size of the corpus of documents or as a function of the nature of the documents contained in the corpus of documents or both, so as to obtain a granularity desired for the filtering.

10. An apparatus for automatically filtering a corpus of documents containing textual and non-textual information of a natural language, the apparatus being characterized in that it comprises:
    means for dividing the corpus of documents into appropriate portions;
    means for determining for each portion of the corpus of documents a regularity value measuring the conformity of the portion with respect to character sequences probabilities predetermined for said language;

means for comparing each regularity value with a threshold value to decide whether the conformity is sufficient; and means for rejecting any portion of the corpus of documents whose conformity is not sufficient.

11. Apparatus according to claim 10, wherein said character sequences probabilities are derived from a statistical model representative of said language.

12. Apparatus according to claim 11, wherein for each portion of the corpus of documents, said regularity value ($V_R$) is based on a computed perplexity of the portion with respect to said statistical model.

13. Apparatus according to claim 11, wherein said statistical model is previously elaborated from a reference document determined as conforming with the rules of said language.

14. Apparatus according to claim 11, wherein said statistical model is being determined according to N-gram statistics.

15. Apparatus according to claim 11, wherein said statistical model is a character-based N-gram model.

16. Apparatus according to claim 11, wherein said statistical model is initially used to filter a first corpus segment of a predetermined size to provide a first filtered segment of the corpus of documents, said first filtered segment serving as a basis for computing a more accurate statistical model which is to be used to filter the rest of the corpus of documents.

17. Apparatus according to claim 10, wherein said threshold value ($V_T$) is determined by executing the steps comprising:

defining a test corpus as a subset of the corpus of documents to be filtered;

manually cleaning said test corpus so as to obtain a cleaned test corpus which is representative of the type of textual information that is considered as being sufficiently in conformity with the language rules and a rejected test corpus that is the complement of said cleaned test corpus;

computing a perplexity value for each of said cleaned and rejected test corpora with regard to said statistical model; and setting the threshold value searched between the perplexity values computed.

18. Apparatus according to claim 10, wherein said portions comprise lines, paragraphs, and whole documents—whose size is determined as a function of the overall size of the corpus of documents or as a function of the nature of the documents contained in the corpus of documents or both, so as to obtain a granularity desired for the filtering.

19. A computer system comprising an apparatus according to claim 10.

20. A computer-readable program storage medium which stores a program for executing a method for automatically filtering a corpus of documents containing textual and non-textual information of a natural language, the method being characterized in that it comprises the steps of:

dividing the corpus of documents into appropriate portions;

determining for each portion of the corpus of documents a regularity value ($V_R$) measuring the conformity of the portion with respect to character sequences probabilities predetermined for said language;

comparing each regularity value with a threshold value ($V_T$) to decide whether the conformity is sufficient; and rejecting any portion of the corpus of documents whose conformity is not sufficient.

21. Computer-readable program storage medium according to claim 20, wherein said character sequences probabilities is derived from a statistical model representative of said language.

22. Computer-readable program storage medium according to claim 21, wherein for each portion of the corpus of documents, said regularity value ($V_R$) is based on a computed perplexity of the portion with respect to said statistical model.

23. Computer-readable program storage medium according to claim 21, wherein said statistical model is previously elaborated from a reference document determined as conforming with the rules of said language.

24. Computer-readable program storage medium according to claim 21, wherein said statistical model is being determined according to N-gram statistics.

25. Computer-readable program storage medium according to claim 21, wherein said statistical model is a character-based N-gram model.

26. Computer-readable program storage medium according to claim 21, wherein said statistical model is initially used to filter a first corpus segment of a predetermined size to provide a first filtered segment of the corpus of documents, said first filtered segment serving as a basis for computing a more accurate statistical model which is to be used to filter the rest of the corpus of documents.

27. Computer-readable program storage medium according to claim 20, wherein said threshold value ($V_T$) is determined by executing the steps comprising:

defining a test corpus as a subset of the corpus of documents to be filtered;

manually cleaning said test corpus so as to obtain a cleaned test corpus which is representative of the type of textual information that is considered as being sufficiently in conformity with the language rules and a rejected test corpus that is the complement of said cleaned test corpus;

computing a perplexity value for each of said cleaned and rejected test corpora with regard to said statistical model; and setting the threshold value searched between the perplexity values computed.

28. Computer-readable program storage medium according to claim 20, wherein said portions comprise lines, paragraphs, and whole documents—whose size is determined as a function of the overall size of the corpus of documents or as a function of the nature of the documents contained in the corpus of documents or both, so as to obtain a granularity desired for the filtering.

* * * * *